United States Patent
Hu et al.

(10) Patent No.: US 12,308,752 B2
(45) Date of Patent: May 20, 2025

(54) SOFT START CIRCUIT AND POWER SUPPLY CIRCUIT

(71) Applicant: Gree Electric Appliances, Inc. of Zhuhai, Guangdong (CN)

(72) Inventors: Qigui Hu, Guangdong (CN); Ke Yuan, Guangdong (CN); Weijin Li, Guangdong (CN); Xueyun Zheng, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 270 days.

(21) Appl. No.: 18/016,555

(22) PCT Filed: Jul. 12, 2021

(86) PCT No.: PCT/CN2021/105673
§ 371 (c)(1),
(2) Date: Jan. 17, 2023

(87) PCT Pub. No.: WO2022/121305
PCT Pub. Date: Jun. 16, 2022

(65) Prior Publication Data
US 2023/0283189 A1    Sep. 7, 2023

(30) Foreign Application Priority Data
Dec. 10, 2020   (CN) .................. 202011439784.X

(51) Int. Cl.
*H02M 3/335*   (2006.01)
*H02M 1/00*    (2006.01)
*H02M 1/36*    (2007.01)

(52) U.S. Cl.
CPC ..... *H02M 3/33576* (2013.01); *H02M 1/0058* (2021.05); *H02M 1/36* (2013.01); *H02M 1/0009* (2021.05)

(58) Field of Classification Search
CPC ... H02M 1/36; H02M 1/0058; H02M 3/33576
See application file for complete search history.

(56) References Cited

U.S. PATENT DOCUMENTS 9,419,433 B2 * 8/2016 Wei .................... H02H 9/02
10,063,151 B2 * 8/2018 Wiemeyer ............. H02M 3/335
(Continued)

FOREIGN PATENT DOCUMENTS

| CN | 103855679 A | 6/2014 |
| CN | 104426126 A | 3/2015 |

(Continued)

OTHER PUBLICATIONS

CN 202011439784.X, Notice of the First Examination Opinion, Sep. 12, 2024.

*Primary Examiner* — Nguyen Tran
(74) *Attorney, Agent, or Firm* — The Webb Law Firm

(57) ABSTRACT

The present disclosure provides a soft start circuit and a power supply circuit. The soft start circuit is disposed between a negative electrode of a direct current bus capacitor and a negative terminal of a direct current power supply, so as to control, after a start begins, according to the current input by the direct current bus capacitor in a constant current module, whether to electrically connect the direct current power supply and the direct current bus capacitor; one end of the soft start circuit is further connected to a filtering protection module, so as to control, at the beginning of the start, according to the voltage output by the filtering protection module, the direct current power supply to be electrically connected to the direct current bus capacitor.

10 Claims, 2 Drawing Sheets

(56) References Cited

U.S. PATENT DOCUMENTS

| | | | |
|---|---|---|---|
| 2011/0080110 A1 | 4/2011 | Nuhfer et al. | |
| 2014/0098452 A1 | 4/2014 | Wei et al. | |
| 2014/0153140 A1 | 6/2014 | Hart et al. | |
| 2017/0005583 A1* | 1/2017 | Choi | H02M 3/33553 |
| 2018/0026523 A1* | 1/2018 | Nate | H05B 45/10 |
| | | | 318/504 |

FOREIGN PATENT DOCUMENTS

| | | | | |
|---|---|---|---|---|
| CN | 206332447 U | | 7/2017 | |
| CN | 207368636 U | | 5/2018 | |
| CN | 111884520 A | * | 11/2020 | ............ H02M 1/088 |
| CN | 112510985 A | | 3/2021 | |
| CN | 214045432 U | | 8/2021 | |

\* cited by examiner

SOFT START CIRCUIT AND POWER SUPPLY CIRCUIT

CROSS REFERENCE TO RELATED APPLICATIONS

This application is a United States National Phase of International Patent Application No. PCT/CN2021/105673, filed on Jul. 12, 2021, which is based on and claims priority to Chinese Patent Application No. 202011439784.X, filed on Dec. 10, 2020, the disclosures of which are hereby incorporated by reference in their entireties.

BACKGROUND OF THE INVENTION

Field of the Invention

The present disclosure relates to the field of electronic power technology, in particular to a soft start circuit and a power supply circuit.

Description of Related Art

In the related art, loads are generally powered by power circuits. In the related technical schemes of power supplies, the start current is restrained by a relay charging circuit or a thermistor (thermal resistor). Soft start can be realized by using a chip-controlled switch device.

SUMMARY OF THE INVENTION

According to one aspect of the present disclosure, a soft start circuit for a power circuit is provided, wherein the power circuit comprises a filter protection module and a constant current module; the filter protection module is connected to a DC power supply; the constant current module comprises a DC bus capacitor; and the soft start circuit is disposed between a negative terminal of the DC bus capacitor and a negative terminal of the DC power supply; wherein, the soft start circuit is used to, after start of soft start, control the conductivity between the DC power supply and the DC bus capacitor according to a current input from the DC bus capacitor in the constant current module;
a terminal of the soft start circuit is further connected to the filter protection module, and is used to control conductivity between the DC power supply and the DC bus capacitor according to a voltage across output by the filter protection module at the start of soft start.

In some embodiments, the soft start circuit comprises a soft start chip, comprising:
a first pin connected to a positive terminal of the DC power supply through a filter capacitor and a charging resistor in the filter protection module, which is used to input a voltage signal at the start of soft start to control conductivity between a fourth pin and a fifth pin; wherein, the fourth pin is connected to a sampling resistor; the fifth pin is connected to a negative terminal of the DC bus capacitor;
a second pin and a third pin are respectively connected to two terminals of the sampling resistor, and are used to detect a voltage across over the two terminals of the sampling resistor, wherein the voltage across over the two terminals of the sampling resistor is proportional to a current input from the DC bus capacitor;
the soft start chip is used to control conductivity (on/off) between the fourth pin and the fifth pin according to the voltage across over the two terminals of the sampling resistor after start of soft start, thereby controlling the conductivity between the DC power supply and the DC bus capacitor.

In some embodiments, the soft start chip further comprises:
a first switch, which is disposed between the fourth pin and the fifth pin, and has a control terminal connected to the first pin; the first switch is used to control conductivity between the fourth pin and the fifth pin through the first switch's own conductivity;
a detection unit disposed between the second pin and the third pin for detecting the voltage across over two terminals of the sampling resistor;
a second switch, which is disposed between the second pin and the first pin, and is switched on if the voltage across over the two terminals of the sampling resistor is greater than a first preset value, so as to control the first switch to be switched off; the second switch is switched off if the voltage across over the two terminals of the sampling resistor is less than a second preset value, so as to control first switch to be switched on; wherein, the second preset value is smaller than the first preset value.

In some embodiments, the soft start chip further comprises:
a first unidirectional element connected between the second pin and the first pin, and connected in series with the second switch to control the flow of current from the first pin to the second pin.

In some embodiments, the soft start chip further comprises:
a voltage regulator unit disposed between a gate electrode and a source electrode of the first switch to stabilize a voltage across between the gate electrode and the source electrode of the first switch.

In some embodiments, the soft start chip further comprises: an inductor having a first terminal connected to the negative terminal of the DC bus capacitor, and a second terminal connected to the fifth pin;
the soft start chip further comprises: a sixth pin having a first terminal connected to the fifth pin, and a second terminal connected between a positive terminal of the DC power supply and a positive terminal of the DC bus capacitor;
the inductor, the fifth pin, the sixth pin and the DC bus capacitor form a closed loop for maintaining the voltage across over the two terminals of the DC bus capacitor when the DC power supply stops supplying power to the DC bus capacitor.

In some embodiments, the soft start chip further comprises:
a second unidirectional element having an anode connected to the fifth pin, and a cathode connected to the sixth pin; the second unidirectional element is used to control the flow of current from the fifth pin to the sixth pin.

In some embodiments, the soft start chip further comprises:
a seventh pin connected between the positive terminal of the DC power supply and the positive terminal of the DC bus capacitor, and used to input a voltage signal, so as to control the first switch to maintain the conductivity state after the start of soft start.

In some embodiments, the soft start chip further comprises:
a voltage across limiting resistor disposed between the seventh pin and a line connected between the positive terminal of the DC power supply and the positive terminal of the DC bus capacitor to limit an input voltage across of the seventh pin.

According to another aspect of the present disclosure, a power supply circuit is provided, comprising: a filter protection module, a constant current module and a soft start circuit of the above embodiment.

DESCRIPTION OF THE INVENTION

Figure 1:
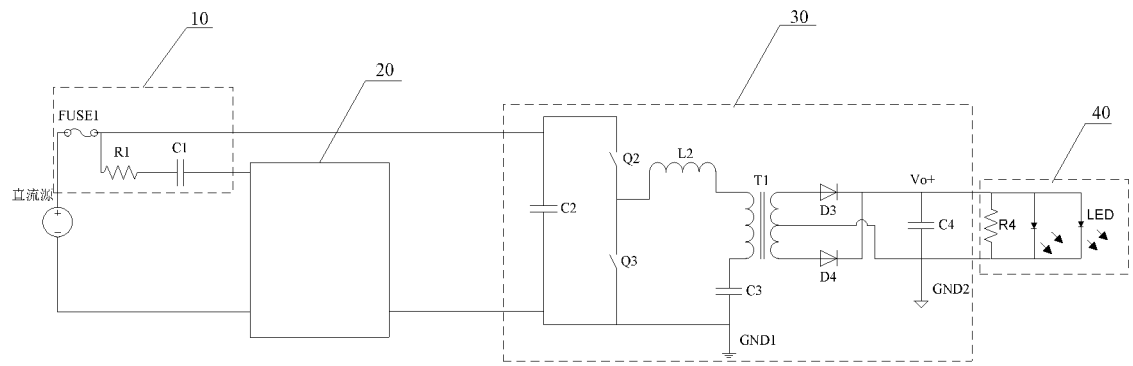
FIG. 1 is a structural diagram of a power supply circuit and a soft start circuit in some embodiments of the present disclosure.

In order to make objectives, technical schemes and advantages of the present disclosure more clear, the present disclosure will be further described in detail with reference to the accompanying drawings. Obviously, merely some embodiments of this disclosure, rather than all embodiments thereof, are given herein. All other embodiments obtained by those of ordinary skill in the art based on the embodiments of the present disclosure without creative efforts shall fall within the protection scope of the present disclosure.

The terms used in the embodiments of the present disclosure are only for the purpose of describing specific examples, but are not intended to limit the present disclosure. The singular forms of "a", "said" and "the" as used in the present disclosure and in the appended claims are also intended to comprise the plural forms, unless the context clearly dictates otherwise. The expression "multiple" generally comprises at least two.

It should be understood that the term "and/or" as used herein is simply a description of the association of related objects, indicating that there may be three possible relationships of the related objects, for example, A and/or B can indicate the presence of A alone, the presence of both A and B, and the presence of B alone. A alone, A and B together, and B alone. In addition, the character "/" in this description generally indicates that the objects associated before and after "/" have an "or" relationship.

It should be understood that although the terms "first", "second", and the like may be used to describe switches in the embodiments of the present disclosure, these switches should not be limited by these terms. These terms are only used to distinguish different switches. For example, without departing from the scope of the embodiments of the present disclosure, a first switch can also be referred to as a second switch, and similarly, a second switch can also be referred to as a first switch.

Depending on the context, the word "if" as used herein can be interpreted as "when" or "in response to determination" or "in response to detection". Similarly, depending on the context, the phrase "if it is determined" or "if (stated condition or event) is detected" can be interpreted as "when it is determined" or "in response to determination" or "when (stated condition or event) is detected" or "in response to detection of (stated condition or event)".

Further, terms "comprise", "comprise" or their any other variations are intended to encompass non-exclusive composition, so that a product or device comprising a series of factors may comprise not only these factors, but also other factors that are not listed explicitly, or factors intrinsic to this product or device. Without limitation, a factor defined by wording "comprise one . . . " does not exclude the existence of other same factors in a product or device comprising such factor.

With the increasing requirements for the integration and miniaturization of load (such as LED lights) circuits, the circuit is complex and has a large volume. Thermistors always cause losses after start, and are sensitive to temperature. When lamps are turned on/off at high temperature, the current suppression effect of thermistors is weakened, and the circuit devices cannot be effectively protected.

Soft start can be realized by using a chip-controlled switch device, but it needs a chip-controlled circuit and control programs, which makes the design of the load power circuit more complex.

In view of the problem that the design of the power supply circuit required for the soft start function in the related art is complicated and difficult to implement, no effective solution has been proposed at present.

An embodiment of the present disclosure provides a soft start circuit and a power supply circuit to solve the problem that the design of the power supply circuit required for the soft start function in the related art is complex and difficult to implement.

With the technical solution of the present disclosure, a soft start circuit is disposed between the negative terminal of the DC bus capacitor and the negative terminal of the DC power supply; wherein the soft start circuit is used to, after start of soft start, control the conductivity between the DC power supply and the DC bus capacitor according to a current input from the DC bus capacitor in the constant current module; a terminal of the soft start circuit is further connected to the filter protection module, and is used to control conductivity between the DC power supply and the DC bus capacitor according to a voltage across output by the filter protection module at the start of soft start. When the input current of the DC bus capacitor is too large, the DC power supply can be controlled to be disconnected to the DC bus capacitor. Soft start is realized only through the soft start circuit. The circuit structure is simple, without complex control programs, and the control efficiency can be improved.

Below, some embodiments of this disclosure will be described with reference to the drawings.

This embodiment provides a soft start circuit for a power circuit. FIG. 1 shows the structure diagram of the power circuit and the soft start circuit in some embodiments of the disclosure. The power circuit comprises a DC power supply, a filter protection module 10 and a constant current module 30. The filter protection module 10 comprises a charging resistance R1, a filter capacitor C1 and a fuse tube FUSE1. The filter capacitor C1 is connected to the DC power supply through the charging resistance R1 and the fuse tube FUSE1. The constant current module 30 comprises a DC bus capacitor C2. A positive terminal of the DC bus capacitor C2 is connected to the positive terminal of the DC power supply through the fuse tube FUSE1, and its negative terminal is connected to a negative terminal of the DC power supply. The constant current module 30 further comprises a half bridge resonant circuit composed of a switch tube Q2, a switch tube Q3, a second inductor L2, a transformer T1, and a third capacitor C3 to achieve efficient isolation and conversion. Diodes D3, D4 and a fourth capacitor C4 form a rectifier circuit, which outputs a voltage across to a LED light source module 40 through a positive terminal V0+. The LED light source module 40 comprises two LED lamp beads connected in parallel, and can further comprise a resistor R4, which is connected in parallel over the two terminals of the LED lamp bead.

As shown in FIG. 1, the soft start circuit 20 is disposed between the negative terminal of the DC bus capacitor C2 in the constant current module 30 and the negative terminal of the DC power supply to control the conductivity between the DC power supply and the DC bus capacitor C2, according to a current input from the DC bus capacitor C2 in the constant current module 30 after start of soft start.

A terminal of the soft start circuit 20 is further connected to the filter protection module 10. The soft start circuit 20 is configured to control conductivity between the DC power supply and the DC bus capacitor C2 according to a voltage output by the filter protection module 10 at the start of soft start.

With the soft start circuit of the present embodiment, a soft start circuit is disposed between the negative terminal of the DC bus capacitor and the negative terminal of the DC power supply. After start of soft start, the soft start circuit controls the conductivity between the DC power supply and the DC bus capacitor according to a current input from the DC bus capacitor in the constant current module. A terminal of the soft start circuit is further connected to the filter protection module, and is used to control conductivity between the DC power supply and the DC bus capacitor according to a voltage across output by the filter protection module at the start of soft start. When the input current of the DC bus capacitor is too large, the DC power supply can be controlled to be disconnected to the DC bus capacitor. Soft start is realized only through the soft start circuit. The circuit structure is simple, without complex control programs, and the control efficiency can be improved.

Figure 2:
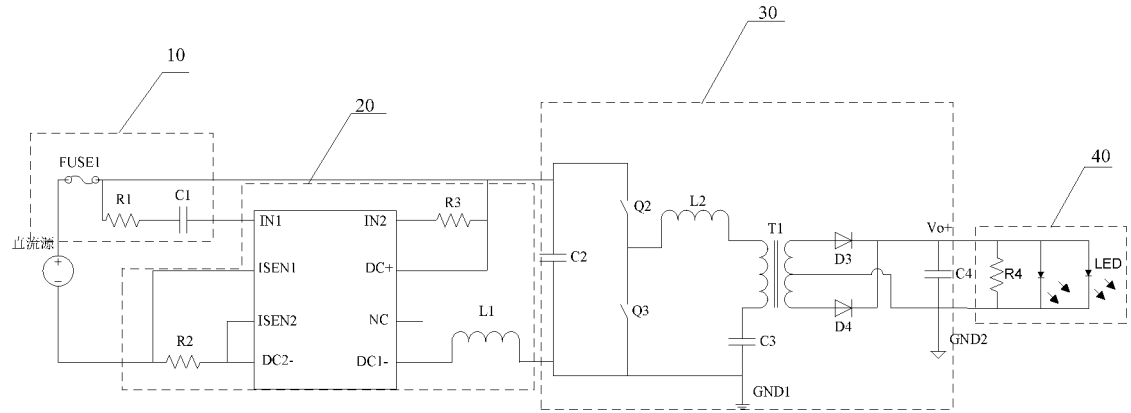
FIG. 2 is the structure diagram of the soft start circuit in other embodiments of the present disclosure.

FIG. 2 is the structure diagram of a soft start circuit of other embodiments of the present disclosure. To realize the soft start function, the soft start circuit comprises a soft start chip IC comprising: a first pin IN1, a second pin ISEN1, a third pin ISEN2, a fourth pin DC2−, and a fifth pin DC1−.

The first pin IN1 is connected to a positive terminal of a DC power supply through a filter capacitor C1 and a charging resistor R1 in the filter protection module 10, and is configured to input a voltage signal at the start of soft start to control conductivity between the fourth pin DC2− and the fifth pin DC1−; the fourth pin DC2− is connected to a sampling resistor R2; the fifth pin DC1− is connected to a negative terminal of the DC bus capacitor; the second pin SEN1 and the third pin SEN2 are respectively connected to two terminals of the sampling resistor R2, and are configured to detect a voltage across over the two terminals of the sampling resistor R2, wherein the voltage across over the two terminals of the sampling resistor R2 is proportional to a current input from the DC bus capacitor. The soft start chip IC is configured to control conductivity between the fourth pin DC2− and the fifth pin DC1− according to the voltage across over the two terminals of the sampling resistor R2 after start of soft start, thereby controlling the conductivity between the DC power supply and the DC bus capacitor.

Figure 3:
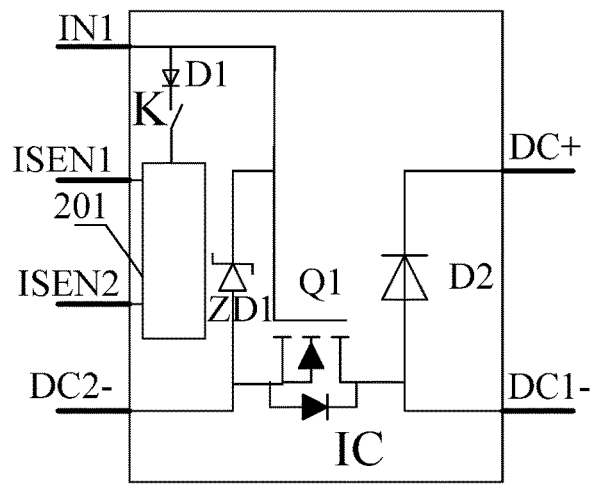
FIG. 3 is a structural diagram of a soft start chip in some embodiments of the present disclosure.

FIG. 3 is the structure diagram of the soft start chip in some embodiments of the present disclosure. In order to control conductivity between the fourth pin DC2− and the fifth pin DC1− according to the voltage across over the two terminals of the sampling resistor R2, as shown in FIG. 3, the soft start chip IC further comprises: a first switch Q1, a detection unit 201, and a second switch K.

A first switch Q1 is disposed between the fourth pin DC2− and the fifth pin DC1−, and has a control terminal connected to the first pin IN1; the first switch Q1 is used to control conductivity between the fourth pin DC2− and the fifth pin DC1− through the first switch Q1's own conductivity.

The detection unit 201 is disposed between the second pin SEN1 and the third pin SEN2, and is configured to detect the voltage across over the two terminals of the sampling resistor R2.

The second switch K is disposed between the second pin SEN1 and the first pin IN1, and is configured to conduct if the voltage across over the two terminals of the sampling resistor R2 is greater than a first preset value, so as to control the first switch Q1 to be switched off; the second switch K is switched off if the voltage across over the two terminals of the sampling resistor R2 is less than a second preset value, so as to control the first switch to be switched on; the second preset value is less than the first preset value, and the values of the second preset value and the first preset value need to be determined according to a maximum current allowed by the DC bus capacitor and a resistance value of the sampling resistor R2. Through the repeated close and open of the second switch K, the first switch Q1 is controlled to be switched on and switched off repeatedly, so as to control the current flowing into the DC bus capacitor, that is, to control the start current.

In order to avoid the current flowing from the second pin ISEN1 to the first pin IN1, the soft start chip IC as shown in FIG. 2 further comprises: a first unidirectional element D1 connected between the second pin SEN1 and the first pin IN1, and connected in series with the second switch K to control the flow of current from the first pin IN1 to the second pin SEN1.

If the drive voltage across of the first switch Q1 is too large, it may lead to the failure of the first switch Q1. To avoid this situation, the above soft start chip IC further comprises: a voltage regulator unit ZD1 disposed between a gate electrode and a source electrode of the first switch Q to stabilize a voltage across between the gate electrode and the source electrode of the first switch, that is, to limit the drive voltage across of the first switch Q1.

According to the above, when the current of the DC bus capacitor C2 is greater than the first preset value, the DC power supply is controlled to be disconnected to the DC bus capacitor C2. At this point, the DC bus capacitor C2 loses power supply. In order to maintain the voltage across over the two terminals of the DC bus capacitor C2 when the DC power supply is disconnected to the DC bus capacitor C2, the soft start chip IC as shown in FIG. 3 further comprises: a sixth pin DC+, a first terminal of which is connected to the fifth pin DC1−. As shown in FIG. 2, the above soft start circuit further comprises: an inductor L1 having a first terminal connected to the negative terminal of the DC bus capacitor C2, and a second terminal connected to the fifth pin DC1−. A second terminal of the sixth pin DC+ is connected between the positive terminal of DC power supply and the positive terminal of the DC bus capacitor C2.

The inductor L1, the fifth pin DC1−, the sixth pin DC+ and the DC bus capacitor form a closed loop, which is configured to maintain the voltage across over the two terminals of the DC bus capacitor C2 when the DC power supply stops supplying power to the DC bus capacitor C2.

In order to avoid a current flowing from the sixth pin DC+ to the fifth pin DC1−, as shown in FIG. 3, the above soft start chip IC further comprises: a second unidirectional element D2 having an anode connected to the fifth pin DC1−, and a cathode connected to the sixth pin DC+; the second unidirectional element is used to control the flow of current from the fifth pin DC1+ to the sixth pin DC+.

Since the first pin IN1 is connected to the filter capacitor C1, after the start of soft start, the bus capacitor C1 has a DC input. The filter capacitor C1 has the function of DC isolation, so the voltage signal is no longer input to the first pin IN1. In order to control the first switch Q1 to be switched on continuously, and then control the load to be connected to the DC power supply, as shown in FIG. 2, the above soft start chip IC further comprises a seventh pin N2.

The seventh pin N2 connected between the positive terminal of the DC power supply and the positive terminal of the DC bus capacitor C2, which is used to input a voltage signal, so as to control the first switch to be switched on after the start of soft start.

Since it is not allowed to input a too high voltage across on a chip pin, in order to limit the voltage across input by the seventh pin IN2, as shown in FIG. 2, the above soft start circuit further comprises: a voltage across limiting resistor R3 disposed between the seventh pin IN2 and a line connected between the positive terminal of the DC power supply and the positive terminal of the DC bus capacitor C2 to limit an input voltage across of the seventh pin IN2. The above chip IC can also comprise a reserved pin NC.

Figure 4:
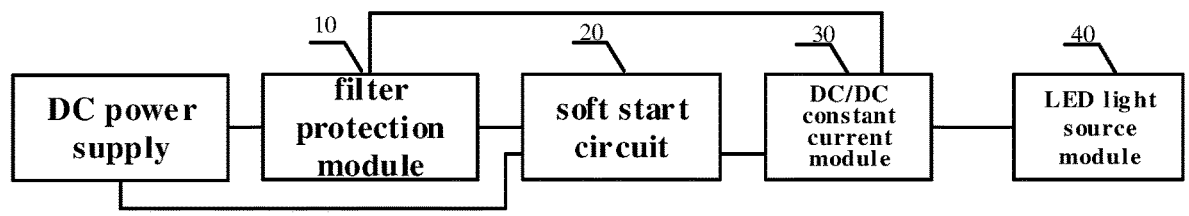
FIG. 4 is a schematic diagram of the module composition of the power circuit in some embodiments of the present disclosure.

FIG. 4 is a structural diagram of a power circuit according to other embodiments of the present disclosure. The power circuit comprises a filter protection module 10, a constant current module 30, and a soft start circuit 20. The constant current module 30 is connected to a LED light source module 40. The soft start circuit 20 is configured to control the start current through the soft start circuit 30 to avoid excessive start current.

The soft start circuit of the other embodiments of this disclosure is used in a power circuit, as shown in FIG. 1, the power circuit comprising: a filter protection module 10, a soft start circuit 20, a DC/DC constant current module 30 (i.e., the constant current module 30 in the above embodiment), and a LED light source module 40. A DC output current is input to the filter protection module 10 through the DC bus, and the soft start circuit 20, through collecting voltage and current signals, controls to switch the built-in switch tubes on and off at a high frequency to charge the DC bus capacitor C2, and then outputs a drive current through the post-stage DC/DC constant current module 30 to control the LED light source module to light up, so as to complete the soft start process.

The filter protection module 10 comprises: a charging resistor R1, a filter capacitor C1, a fuse tube FUSE1, which is configured to, when a serious short circuit fault occurs in the post-stage circuit, cut off the fault to avoid affecting the power supply of the DC source bus.

The DC/DC constant current module 30 comprises a half bridge resonant circuit composed of a switch tube Q2, a switch tube Q3, an inductor L2, a transformer T1, and a third capacitor C3 to achieve efficient isolation and conversion. Diodes D3, D4 and a fourth capacitor C4 form a rectifier circuit, which outputs a voltage across to the LED light source module 40 through a positive terminal V0+. The LED light source module 40 comprises two LED lamp beads connected in parallel, and can further comprise a resistor R4, which is connected in parallel over the two terminals of the LED lamp bead.

The soft start circuit comprises the soft start chip IC, as shown in FIG. 3, a first pin through a seventh pin, a detection unit 201, a second switch K (i.e., the second switch K in the above embodiment), a diode D1 (i.e., the first unidirectional conduction element D1 in the above embodiment), a diode D2 (i.e., the second unidirectional conduction element D2 in the above embodiment), a voltage regulator ZD1 (i.e., the voltage regulator unit ZD1 in the above embodiment), and a switch tube Q1 (i.e., the first switch Q1 in the above embodiment).

The working principle of the soft start IC is as follows.

The first pin IN1 of the soft start chip IC is connected to the filter capacitor C1 and the charging resistor R1 in sequence. When the DC source is turned on, the DC power supply charges the filter capacitor C1 through the charging resistor R1. A rising edge voltage signal is generated to switch the switch tube Q1 on. The voltage regulator ZD1 limits the value of the drive voltage of the switch tube Q1, so as to protect the switch tube Q1. When the drive voltage Vgs reaches a switch-on threshold value of the switch tube Q1, the switch tube Q1 is switched on. At this point, the DC bus capacitor C2, the inductor L1 and the sampling resistor R2 form a loop, and the DC power supply charges the DC bus capacitor C2. Since the capacitor voltage cannot vary abruptly, the charging current of the DC bus capacitor C2 increases at the moment of power-up. According to the principle that the current of the inductor L1 cannot change abruptly, the peak current can be suppressed. The current passing through the fifth pin DC1− of the soft start chip IC and the switch tube Q1 is output by the fourth pin DC2−, and returns to the negative terminal of the DC power supply passing through the current sampling resistor R2.

A voltage signal (U=R×I) is generated over the two terminals of the sampling resistor R2. The second pin ISEN1 and the third pin ISEN2 of the soft start IC collect a voltage signal U over the two terminals of sampling resistor R2, which is then transmitted to the detection module 201. When the voltage across U is higher than a first reference value Von_ref, the second pin ISEN1 is connected to the negative terminal of the DC power supply, and the drive voltage Vgs of the switch tube Q1 will be pulled down, to switch off the switch tube Q1 accordingly. After the switch tube Q1 is switched off, a freewheeling current is produced over the DC bus C2 through the inductor L1 and the diode D1 to maintain the voltage over the two terminals of the DC bus C2. When the voltage U over the two terminals of the sampling resistor R2 is less than a second reference value Voff_ref, the detection module 201 controls to disconnect the second pin ISEN1 from the negative terminal of the DC power supply. At this point, the DC power supply charges C1 through the charging resistance R1, generating a rising edge voltage signal, which makes the drive voltage Vgs of the switch tube increase, and then the switch tube Q1 is controlled to be switched on, repeatedly.

Through calculating, changing the resistance value of the sampling resistor R2, so that the peak current in the soft start process can be changed to meet the needs of different products, which can also achieve the effect of over-current protection for the circuit input.

When the voltage over the two terminals of the DC bus capacitor C2 gradually approaches the bus voltage value, the charging current will gradually decrease. When the voltage U over the two terminals of the sampling resistor R2 is always less than the Voff_ref value, the detection module 201 controls to disconnect the second pin ISEN1 from the negative terminal of the DC power supply constantly. The drive voltage across Vgs is kept at a high level through the seventh pin IN2, and the switch tube Q1 is controlled to be always switched on to complete the soft start process.

Figure 5:
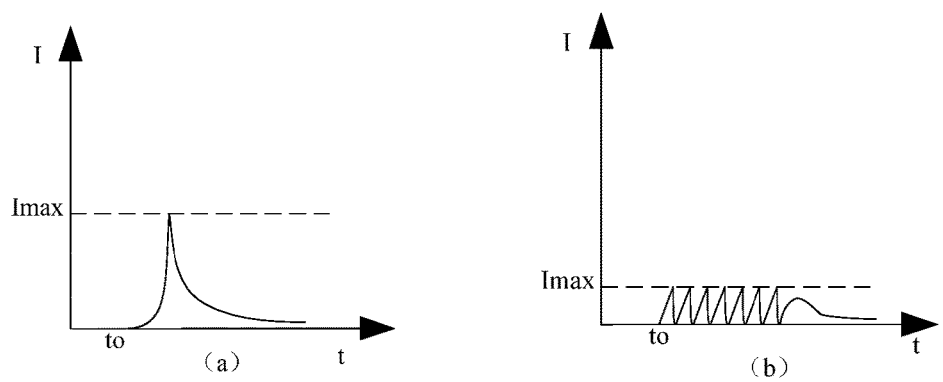
FIG. 5 is a comparison diagram of the start current waveform of the start circuit in the related technology and the start current waveform of the soft start circuit in some embodiments of the present disclosure.

FIG. 5 is a diagram showing a comparison between the start current waveform of the start circuit in the related art and the start current waveform of the soft start circuit in the embodiment of the present disclosure. FIG. 5(a) shows the start current waveform of the start circuit in the related technology, FIG. 5(b) shows the start current waveform of the soft start circuit according to some embodiments of the present disclosure; t0 is the start time of startup. As can be seen from this comparison, compared with the related art, the value of the peak current Imax decreases a lot after using the soft start circuit of the present disclosure, and the maximum current overshooting value can be calculated and set correspondingly.

After the soft start process, the DC bus capacitor C2 reaches a bus voltage setting value, and the post-stage DC/DC constant current module is activated to drive the load. In some embodiments, the load is a LED light source module. After the completion of soft start, the LED light source module is lighted up.

The circuit embodiments described above are only schematic, wherein the units described as separate components may or may not be physically separated, and the component illustrated as a unit may or may not be a physical unit, may be located in one place, or may be distributed on multiple network units. Some or all of the modules may be selected according to actual needs to implement the solution of this embodiment.

Through the description of the above embodiments, those skilled in the art may clearly understand that each embodiment can be implemented by means of software and a necessary general hardware platform, or by hardware. Based on this understanding, the above technical solution of the present disclosure essentially or in other word, a portion thereof that contributes to the related technology or all or part of the technical solution can be embodied in the form of a software product, which is stored in a storage medium, such as a ROM/RAM, a magnetic disk, and an optical disk, comprising instructions to cause a computer device (which may be a personal computer, a server, or a network device, etc.) to perform all or part of the steps of the method described in the various embodiments of the present disclosure.

It shall be noted that: the above embodiments are merely illustration of the technical solution of this disclosure, but are not limitation thereof. Although this disclosure has been described in detail with reference to the above embodiment, those ordinary skilled in the art shall understand: the technical solutions recited in the various embodiments described above may be modified or some technical features thereof may be substituted equivalently, such modifications or substitutions do not deviate the nature of the technique from the spirit and scope of the technique embodied in the embodiments according to this disclosure.

What is claimed is:

1. A soft start circuit for a power circuit, the power circuit comprising a filter protection module and a constant current module, the filter protection module connected to a DC (Direct Current) power supply, and the constant current module comprising a DC bus capacitor, the filter protection module comprising a charging resistance, a filter capacitor, and a fuse tube,
   the soft start circuit being disposed between a negative terminal of the DC bus capacitor and a negative terminal of the DC power supply, and configured to control conductivity between the DC power supply and the DC bus capacitor, after a start of soft start, according to a current input from the DC bus capacitor in the constant current module, and
   a terminal of the soft start circuit being further connected to the filter protection module, and configured to control conductivity between the DC power supply and the DC bus capacitor, at the start of soft start, according to a voltage across output from the filter protection module.

2. The soft start circuit according to claim 1, further comprising a soft start chip, wherein the soft start chip comprises:
   a first pin connected to a positive terminal of the DC power supply through a filter capacitor and a charging resistor in the filter protection module, and configured to input a voltage signal at the start of soft start to control conductivity between a fourth pin and a fifth pin of the soft start chip, wherein the fourth pin is connected to a sampling resistor, and the fifth pin is connected to the negative terminal of the DC bus capacitor;
   a second pin and a third pin that are respectively connected to two terminals of the sampling resistor, and are configured to detect a voltage across over the two terminals of the sampling resistor, wherein the voltage across over the two terminals of the sampling resistor is proportional to a current input from the DC bus capacitor, and
   wherein the soft start chip is configured to control the conductivity between the fourth pin and the fifth pin according to the voltage across over the two terminals of the sampling resistor after the start of soft start, for controlling conductivity between the DC power supply and the DC bus capacitor.

3. The soft start circuit according to claim 2, wherein the soft start chip further comprises:
   a first switch disposed between the fourth pin and the fifth pin and having a control terminal connected to the first pin, and configured to control conductivity between the fourth pin and the fifth pin through the first switch's own conductivity;
   a detection unit disposed between the second pin and the third pin configured to detect the voltage across over the two terminals of the sampling resistor; and
   a second switch disposed between the second pin and the first pin, and configured to be switched on in a case where the voltage across over the two terminals of the sampling resistor is greater than a first preset value, to control the first switch to be switched off, and to be switched off in a case where the voltage across the two terminals of the sampling resistor is less than a second preset value, to control the first switch to be switched on, wherein the second preset value is smaller than the first preset value.

4. The soft start circuit according to claim 3, wherein the soft start chip further comprises:
   a first unidirectional element connected between the second pin and the first pin, and connected in series with the second switch, and configured to control a flow of current from the first pin to the second pin.

5. The soft start circuit according to claim 3, wherein the soft start chip further comprises:
   a voltage regulator unit disposed between a gate electrode and a source electrode of the first switch, and configured to stabilize a voltage across between the gate electrode and the source electrode of the first switch.

6. The soft start circuit according to claim 2, further comprising:

an inductor having a first terminal connected to the negative terminal of the DC bus capacitor, and a second terminal connected to the fifth pin; and a sixth pin having a first terminal connected to the fifth pin, and a second terminal connected between a positive terminal of the DC power supply and a positive terminal of the DC bus capacitor, wherein the inductor, the fifth pin, the sixth pin (DC+) and the DC bus capacitor (C2) form a closed loop, and are configured to maintain the voltage across over the two terminals of the DC bus capacitor in a case where the DC power supply stops supplying power to the DC bus capacitor.

7. The soft start circuit according to claim 6, wherein the soft start chip further comprises:

a second unidirectional element having an anode connected to the fifth pin, and a cathode connected to the sixth pin, and configured to control a flow of current from the fifth pin to the sixth pin.

8. The soft start circuit according to claim 2, wherein the soft start chip further comprises:

a seventh pin connected between the positive terminal of the DC power supply and a positive terminal of the DC bus capacitor, and configured to input a voltage signal, to control the first switch to maintain conductivity state after the start of soft start.

9. The soft start circuit according to claim 8, wherein the soft start chip further comprises:

a voltage across limiting resistor disposed between the seventh pin and a line connected between the positive terminal of the DC power supply and the positive terminal of the DC bus capacitor, and configured to limit an input voltage across of the seventh pin.

10. A power supply circuit, comprising:

the filter protection module;

the constant current module; and the soft start circuit according to claim 1.

\* \* \* \* \*